US012115631B2

(12) United States Patent
Maloney et al.

(10) Patent No.: US 12,115,631 B2
(45) Date of Patent: Oct. 15, 2024

(54) ROTARY INSTALLATION TOOLS FOR CLINCH FASTENERS

(71) Applicant: Penn Engineering & Manufacturing Corp., Danboro, PA (US)

(72) Inventors: Michael Maloney, Doylestown, PA (US); Kristina Valko, Pipersville, PA (US); Jonathan Olson, Harleysville, PA (US); Brian Bentrim, Furlong, PA (US); Qiang Sun, Novi, MI (US); Ronald Dise, Perkasie, PA (US); Kent Johnston, White Salmon, WA (US)

(73) Assignee: Penn Engineering & Manufacturing Corp., Danboro, PA (US)

( * ) Notice: Subject to any disclaimer, the term of this patent is extended or adjusted under 35 U.S.C. 154(b) by 394 days.

(21) Appl. No.: 17/236,033

(22) Filed: Apr. 21, 2021

(65) Prior Publication Data

US 2021/0331227 A1    Oct. 28, 2021

Related U.S. Application Data

(60) Provisional application No. 63/033,098, filed on Jun. 1, 2020, provisional application No. 63/014,417, filed on Apr. 23, 2020.

(51) Int. Cl.
*B25B 27/00*  (2006.01)
*B23P 11/00*  (2006.01)
(Continued)

(52) U.S. Cl.
CPC ........ *B25B 27/0007* (2013.01); *B23P 11/005* (2013.01); *B23P 19/064* (2013.01); *F16B 37/068* (2013.01); *Y10T 29/49915* (2015.01)

(58) Field of Classification Search
CPC ..... B23P 19/062; B23P 19/064; B23P 11/005; F16B 37/068; F16B 37/064;
(Continued)

(56) References Cited

U.S. PATENT DOCUMENTS 1,842,571 A * 1/1932 Sebell ............... B21F 45/004
                                            29/520
5,655,396 A * 8/1997 Siler ................. B21D 39/06
                                            29/243.517
(Continued)

FOREIGN PATENT DOCUMENTS

CA      3062626 A1 * 11/2018  ........... B21D 39/031

*Primary Examiner* — Matthew P Travers
(74) *Attorney, Agent, or Firm* — Gregory J. Gore, Esq.

(57) ABSTRACT

Tooling is held within the nose of a rotary punch and as the tool is rotated and forced against a workpiece a fastener within the tool becomes affixed to the workpiece. The tools have displacers which non-destructively deform and reshape the workpiece without any loss of workpiece material. The tools have various types of displacers including; tapered and arcuate displacers which act in concert to progressively act upon the workpiece; spherical displacers which may be fixed or rotatable such as caged ball bearings; and a full-circle displacer ring which wobbles as it presses against the workpiece. In the case of fixed spherical displacers, a multi-stroke method can be employed where the tool is rotated after each stroke in a group of installation strokes.

2 Claims, 4 Drawing Sheets

(51) Int. Cl.
*B23P 19/06* (2006.01)
*F16B 37/06* (2006.01)

(58) Field of Classification Search
CPC ......... B25B 27/0007–0014; B21J 15/12; B21J 15/36; B24B 39/003; B24B 39/06
See application file for complete search history.

(56) References Cited

U.S. PATENT DOCUMENTS

| | | | |
|---|---|---|---|
| 6,077,003 A * | 6/2000 | Laube ................... | B23B 31/006 409/234 |
| 10,618,100 B2 * | 4/2020 | Lembach ............... | B21J 15/046 |

* cited by examiner

ROTARY INSTALLATION TOOLS FOR CLINCH FASTENERS

CROSS-REFERENCE TO RELATED APPLICATIONS

This is a non-provisional patent application related to U.S. provisional patent application Ser. No. 63/014,417 filed Apr. 23, 2020 entitled, "Rotary Installation Tool" and U.S. provisional patent application Ser. No. 63/033,098 filed Jun. 1, 2020 entitled, "Rotary Installation Tools for Clinch Fasteners" priority from which is hereby claimed.

FIELD OF THE INVENTION

The present invention relates to the installation of clinch fasteners into a sheet or panel workpiece by use of a rotary press which imparts both rotation and pressing force to the workpiece to achieve attachment of the fastener to the workpiece.

BACKGROUND OF THE INVENTION

Rotary installation displacers can be radial wedges which push and pull metal from the surface of an installation panel, around the base of a clinch fastener. This method greatly reduces the installation force, and consequently the axial compressive stresses, that can cause an undesirable cosmetic mark on the opposite side of the panel from the installation.

While standard rotary installation displacers do reduce installation force and axial stress, the following problems have been observed:

1. Frequently a different shape for the metal being ramped around the fastener is desired. It was observed that if another pressing from a different displacer shape would fill the area around the fastener better than just one wedge shape. Having the ability to add different displacer shapes to the same install tool would be beneficial in more fully filling the volume around the fastener. The ability to have different geometries separated as different displacers on the same punch also reduces the manufacturing complexity of the separate displacers, which when taken together create a composite fill shape which would be difficult to create with one displacer shape.
2. Metal is being sheared from the surface of the installation panel and reshaped during the installation process, mostly from friction and sharp edges on the displacers which must slide around the installation hole.
3. Torsional stresses are created from the rotary installation process with the solid displacers. These stresses, while not vertically axial, can still cause a mark on the cosmetic side of the panel. Reducing the torsional stresses is therefore a desired goal of this disclosure as well.

SUMMARY OF THE INVENTION

In order to solve the problems in the art explained above, the applicant has devised new tooling for rotary presses. The tooling devised is held within the nose of a rotary punch and as the tool is rotated and forced against a workpiece, usually a malleable panel composed of a metal such as aluminum. During the installation process the panel is non-destructively deformed around a fastener held within the tool to affix the fastener to the workpiece. The workpiece panel metal is reshaped without any loss of material.

Rotary installation utilizes a reduced area displacers to reduce the axial installation force by converting much of the installation force to installation torque. Five different types of displacers are possible to accomplish the goal of rotary installation of a fastener that are described in the drawings and embodiments described below, namely:

1. Multiple fixed, reduced area displacers all of the same profile.
2. Multiple fixed, reduced area displacers of different profile to achieve a sequentially acting composite metal flow shape, all on one tool.
3. Multiple displacers where the displacers roll on the surface of the metal while being pushed axially, such as ball bearings. The result is reduced friction given that the displacers are not dragging around the surface of the installation hole, but are rolling instead.
4. A full ring displacer that is pushed incrementally at one point per infinite 360-degree increment as it is advanced forward to displace metal, having the same force reducing quality as the above, with reduced friction given that the displacer does not rotate.
5. Fixed-position displacers evenly spaced about the tool bore are pressed a set distance and rotated in increments. This type utilizes axial oscillation to relieve panel stress following each tool stroke. The number of axial strokes per group is determined by the amount of rotation in the tool following each stroke.

DESCRIPTION OF EMBODIMENTS OF THE INVENTION

The installation tool of the invention comprises a rotary punch press tip which holds a fastener. The tip has displacers which contact a receiving workpiece such as a metal panel to force material of the panel onto a flange of the fastener to attach it. Tips vary in the different types of displacers that they employ. The following four displacer embodiments are illustrated and discussed below. Herein the replaceable tips are also referred to as the "tools". The term "profile" means the three-dimensional configuration of a displacer.

Figure 4:
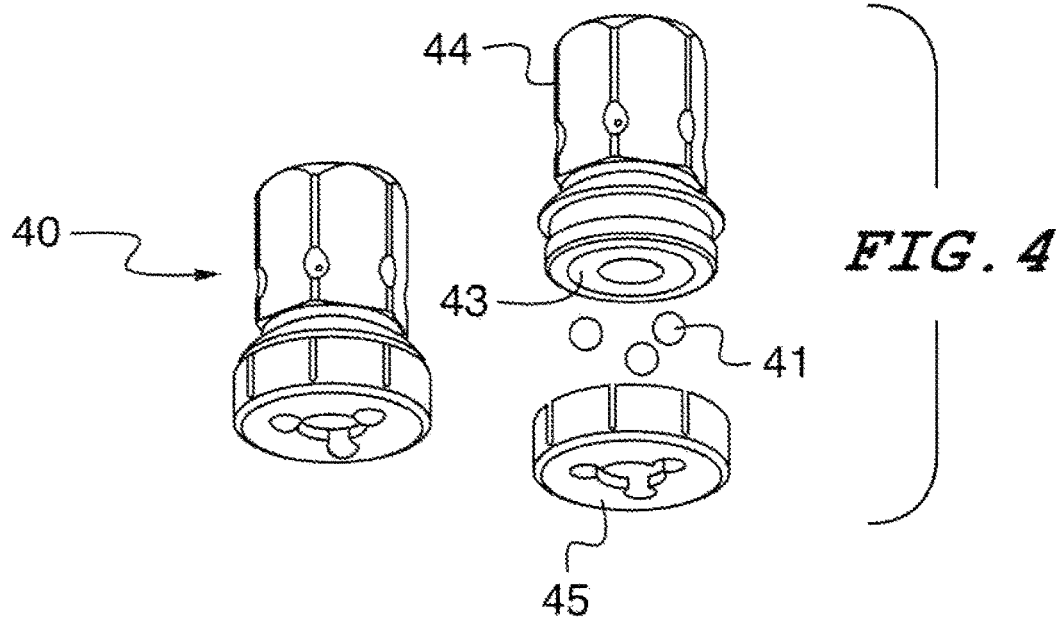
FIG. 4 is a composite of two views showing isometric and exploded views.
Figure 7:
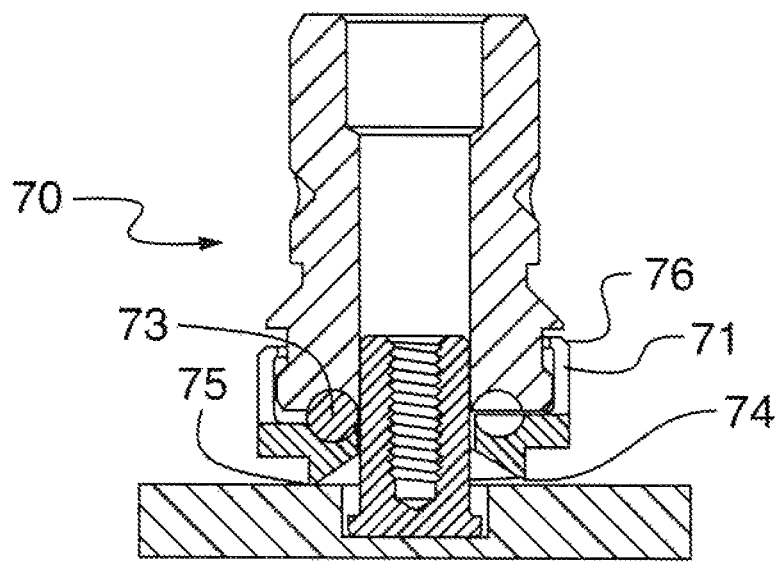
FIGS. 7 and 8 are front elevation sectional views
Figure 8:
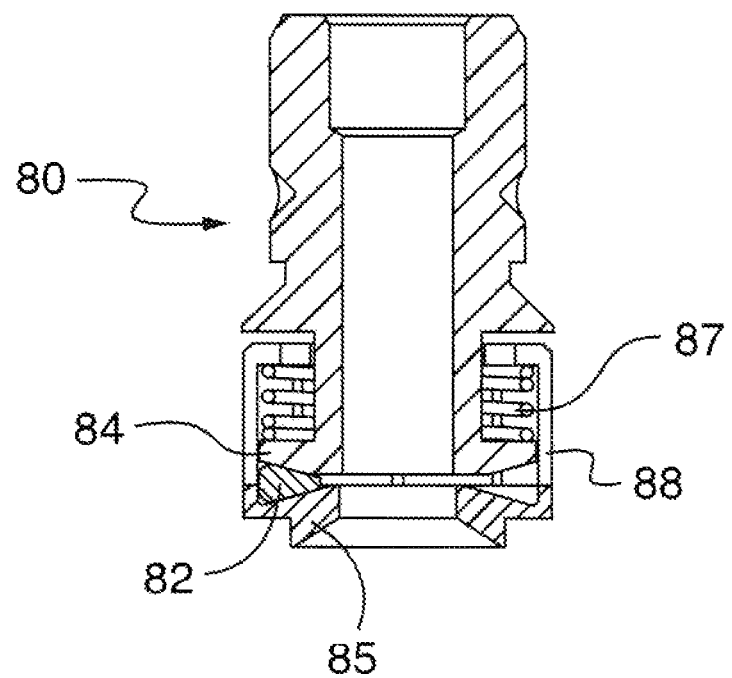

1. Multiple fixed, reduced area displacers of different profiles to achieve a sequentially acting composite metal flow shape, all on one tool. (FIG. 1)
2. A tip with multiple displacers where the displacers such as ball bearings roll on the surface of the metal while being pushed axially (FIG. 4). The result is reduced friction given that the displacers are not dragging around the surface of the installation hole, but are rolling instead.
3. A full ring displacer that is pushed incrementally at one point per infinite increment through 360 degrees as it is advanced forward to displace metal, having the same force reducing quality as the above, with reduced friction given that the displacer itself does not rotate. (FIGS. 7 and 8)

Figure 9:
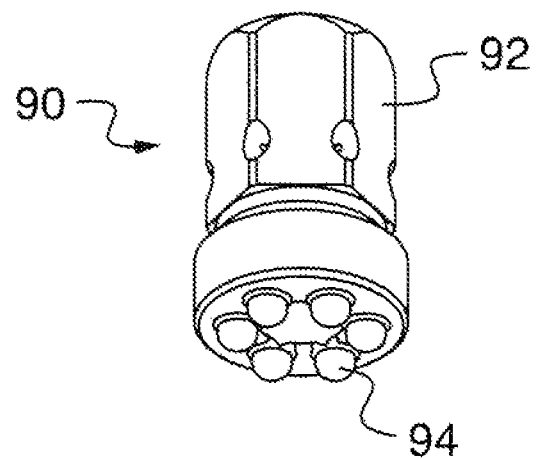
FIG. 9 is a composite view showing a bottom right isometric view and a bottom plan view thereof.
Figure 10:
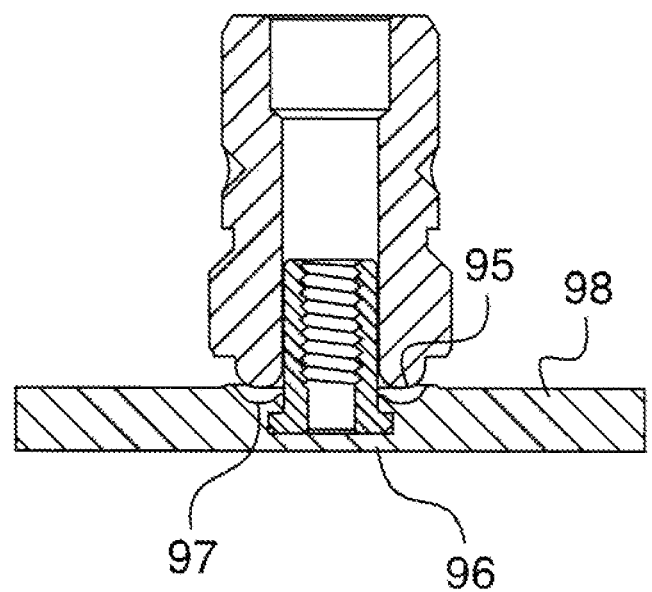
FIG. 10 is a front elevation sectional view.

4. An oscillating punch tip fitted with fixed-position displacers, either rounded or wedge shaped evenly spaced about the tool bore. The tip presses and rotates incrementally between strokes which is repeated at each successive install depth. Axial oscillation is utilized to relieve panel stress. Torsional stress buildup is nearly eliminated and only occurs at the end of each install group of strokes and rotations after the tool has been rotated a complete 360 degrees when the tool is then rotated 360 degrees at the last stroke depth to smooth out displaced panel material. (FIGS. 9 and 10)

Figure 1:
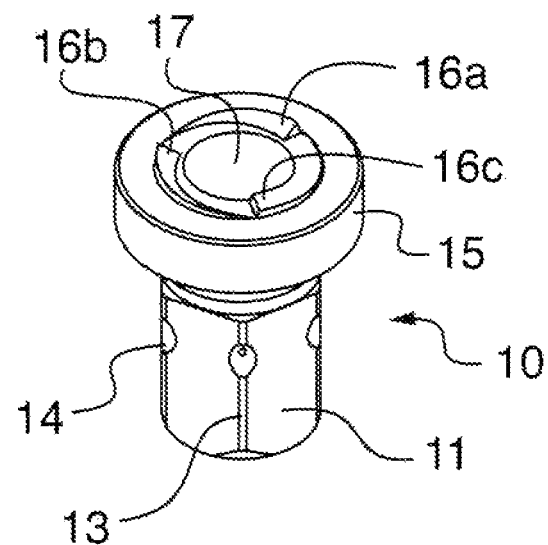
FIG. 1 is a bottom right isometric view.
Figure 2:
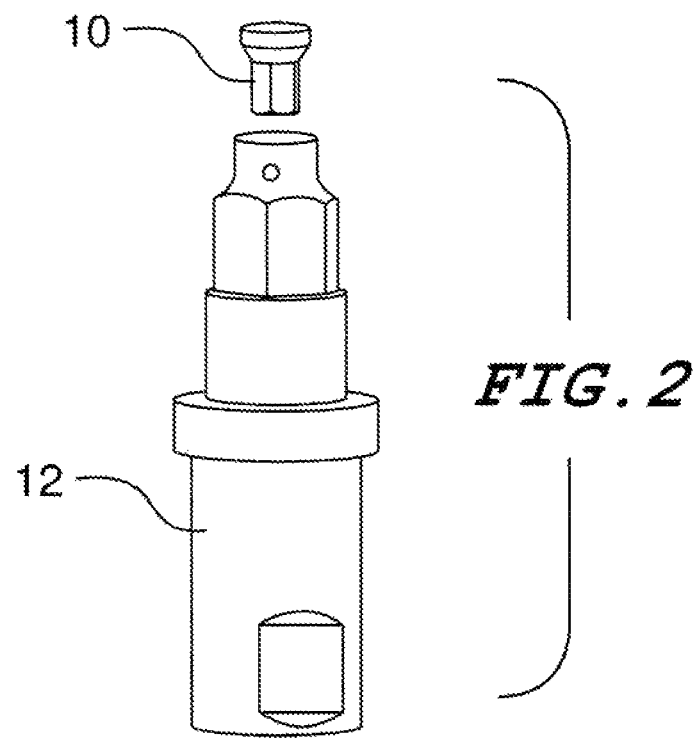
FIG. 2 is a front elevation exploded assembly view.

FIG. 1 depicts one embodiment of a displacer tool 10 according to the invention intended for use in a standard CNC machine which applies both pressing and rotational forces to the punch fixture 12 such as seen in FIG. 2. A complete description of a punch of this type is disclosed in pending co-owned U.S. patent application Ser. No. 16/307,133 which is incorporated herein by reference as though fully set forth. Using the tool tips 10 held within the punch 12 as described below, fasteners can be affixed to malleable metal panels. In all of these embodiments the panels are prepared with blind receiving holes.

With continued reference to FIG. 1, the main elements of the tool tip are a body 14 with attachment means 13 for being held within a rotary punch press fixture 12 as seen in FIG. 2. In this, and other embodiments described herein, the working end of the tool has a flange 15 with an end face that has a plurality of displacers such as those shown at 16*a,b*, and *c* which surround a central bore 17 that holds the fastener while it is being installed. During installation the tool is pressed to a given point and the tool is then rotated at that depth. Three separate displacers are shown, each with a different profile that acts upon the workpiece panel as the tool is rotated. Displacer 16*a* has a ramped profile that parts off the outside diameter of the metal which is pulled in and moves partially toward outside diameter of the fastener being installed. Its profile is vertically tapered along an arcuate ridge centered about the axial bore from a back end of the displacer of greatest height down to a front end of minimum height of the displacer where the ridge meets the end face. Displacer 16*b*, is like an additional snow plow that follows after the first displacer and has a configuration that moves the parted metal even closer to the outside periphery of the fastener being installed. And finally, displacer 16*c*, having a profile rectangular in section, then compresses the peak of displaced material to press the metal tightly down around the fastener.

Figure 3:
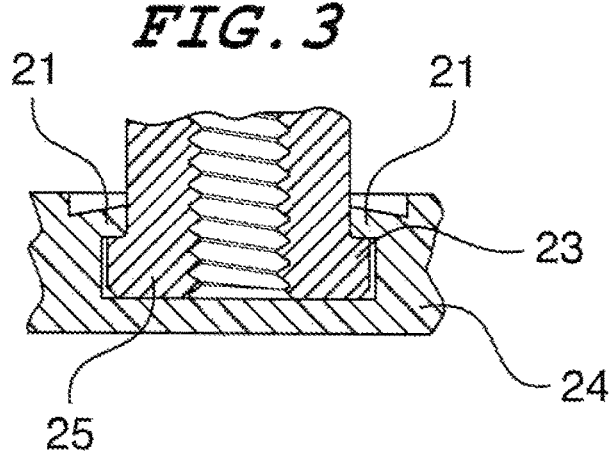
FIG. 3 is a front elevation sectional view.

As seen in FIG. 3, these displacers illustrate how different displacers while operating independently function together to form the desired sequential composite displacement of workpiece material 21. The panel material is reshaped around and above the outside of a flange 23 of fastener 25 which has been inserted into a blind hole of the receiving panel 24. The workpiece panel is cut into and deformed without any loss of panel material.

In another embodiment seen in FIG. 4 rolling balls 41 are employed in a tool tip 40 to displace the panel material.

Figure 5:
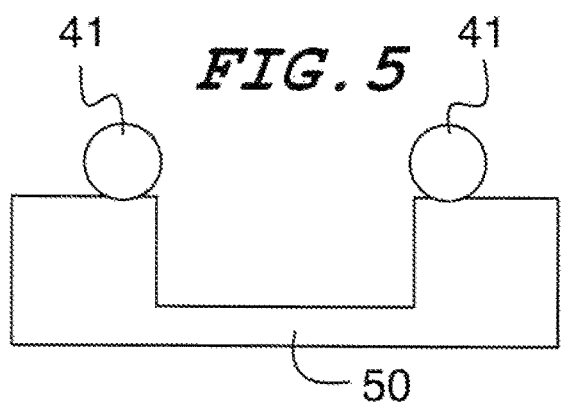
FIGS. 5 and 6 are front elevation sectional views.
Figure 6:
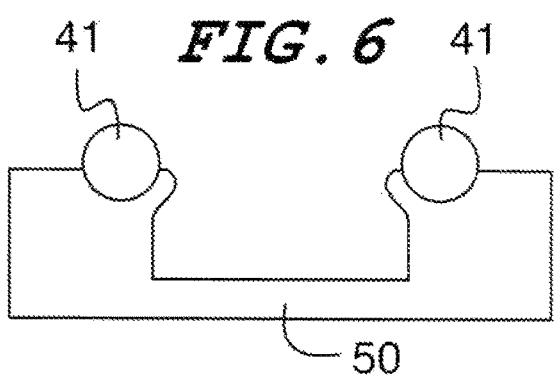

The balls roll between the raceway 43 of the tip body 44 and a snap-in-place retainer 45 affixed to the end of the body. The balls 41 rotate within the tool while simultaneously being pressed into the installation panel, pushing metal above a flange or ledge on the fastener as seen in FIG. 3. Torsional stresses in the panel are greatly reduced over fixed displacers, rolling friction exists, but is minimal. FIGS. 5 and 6 show before-and-after panel displacement how the balls 41 of the rolling ball type of displacer of FIG. 4 moves metal of a panel 51 to captivate a fastener. Rolling ball displacers eliminate sliding friction and the dragging of metal at the surface of the installation panel reducing installation stresses experienced with wedge profile rotary displacers.

In yet another tool tip embodiment 70 depicted in FIG. 7, panel material is moved by a continuous displacement method by a displacer ring 71 that wobbles. The displacer ring is loosely fitting to the tool body both radially and axially by attachment means 76 at the top to allow it to tip to one side or the other as the body is rotated. The displacer ring also has a raceway on which a single ball bearing 73 can travel which further functions to retain the ball 73 within the tool assembly. At its bottom end the displacer ring has a conical profile with a circular cutting edge 74. This displacer applies force to one portion of a full circle displacer through the single ball bearing 73 captivated to the tool body. As the displacer tip is rotated and pushed into the panel, the displacer ring wobbles. The displacement force is applied following the ball bearing around the circumference of the installation causing the displacer to wobble, and thus pressing only a portion of the displacer ring cutting edge at point 75 into the panel at any one point in time. There is no sliding or rolling contact between the displacer and the panel. Unlike multiple displacers which are all pressed into the panel together equally, only a small portion of this displacer is pressed in small increments as the tip is rotated. Since only a small portion of the displacer is being pressed at any given time throughout the installation period, the installation force is greatly reduced. There is no sliding or rolling friction between the panel and displacer, and as such torsional stresses are greatly reduced.

FIG. 8 depicts another embodiment which utilizes an incremental displacer similar to that shown in FIG. 7. This displacer substitutes the ball and raceway structures of FIG. 7 with a cone gear 82 meshed with two circular cone racks 84 and 85, one above and one below. The incorporation of a spring 87 is also added to illustrate how stability to the displacer tip can be added when and if necessary. The cone gear guarantees no slipping between the gear faces and consequently ensures s full 360 degrees of pressing per rotation of the tool body.

In yet another embodiment 90 seen in FIGS. 9 and 10, incremental displacement of panel material is achieved using an oscillation method with individual displacers. The term "oscillation" is used to describe the axial up and down stroking motion of the tool during the installation process, the downward motion referring to the as the advance of the tool toward the workpiece. The term "stroke" means a cyclical downward and then upward motion of the tool returning it to its starting position.

Referring now to FIG. 9, displacers 94 are machined and polished rounded surfaces or rounded fixed pins forming a unitary part of the tool body 92. The displacers shown are spherical at any point where they can contact the panel 98 as seen in FIG. 10. Displacer geometry can also be wedge-shaped as in previous embodiments of this design. The tool body and displacers seen in FIG. 10 are unified in one solid machined body.

In this embodiment the tool is incrementally stroked, and rotated between strokes of a given length which results in a workpiece deformation to a predetermined depth level. As depicted the tool is rotated a set amount (e.g. 20°) before the next stroke is applied. Installation is achieved in incrementally advancing displacement depth levels. The number of axial strokes per depth level is determined by the amount of rotation in the tool following each stroke. Once the tool has rotated sufficiently to cover the angular distance between displacers, the stroke group is complete. The tool is then rotated a complete 360 degrees to smooth out the displaced material, and the process begins again at the next depth which are scalar increments of the initial depth.

Table 1 below provides a breakdown of how installation is achieved via install groups. Each group corresponds to an install depth or 'level'. In this example the number of displacers is 6 (as in FIG. 8), and hence the distance between them is 60 degrees (360/N).

TABLE 1

Installation broken down by install group

| Step | −z (in.) | +z (in.) | rotation (°) |
|---|---|---|---|
| Group 1 (.005" install depth) | | | |
| 1 | 0.005 | 0.010 | 20 |
| 2 | 0.010 | 0.010 | 20 |
| 3 | 0.010 | 0.000 | 360 |
| Group 2 (.010" install depth) | | | |
| 1 | 0.005 | 0.010 | 20 |
| 2 | 0.010 | 0.010 | 20 |
| 3 | 0.010 | 0.000 | 360 |

Group N (continue in scalar increments)

Using this method install groups are customized for each part and correspond to blind hole depth, the number of displacers, and the angular distance between displacers. For instance, if there are 5 displacers the distance between them is 72 degrees. This distance is covered by any number of strokes depending on the amount of rotation per stroke. If the rotation per stroke is 12 degrees, then there are 5 strokes followed by a complete rotation of the tool occurring immediately after the final stroke. Individual displacers, whether ball or wedge are used specifically to minimize the projected area on panel while also moving enough material to achieve installation; this is the purpose of tool rotation following each stroke.

FIG. 10 is a section view of the oscillating tip (fixed ball variant) after a part has been installed. The tip moves material over the part flange as in previous embodiments of this technology with the primary difference being kinetic interference friction is eliminated during the stroke process; rotation of the tool between strokes occurs free of contact with the panel 98. Additionally, compressive panel stress at points of deformation 97 is relieved completely after each stroke of the tool which initiates panel contact with the displacer at point 95. The oscillating tip achieves installation of the part using a series of composite strokes and rotations applied in groups and at successive install depth levels.

Displacing panel material in depth increments achieved with axial oscillation reduces compressive stress build-up in the panel. Torsional stress buildup in the panel is nearly eliminated, and only occurs during the final step which provides a complete 360 degree 'smoothing' rotation. The result is reduced panel stress intended to prevent material near the cosmetic face 96 from reaching a yielding point.

The embodiments described above disclose but a few of the possible examples of the invention which include a combination of mechanical elements with the same functional concepts, but not limited to those embodiments specifically disclosed. Many variations and modifications will be apparent to those of skill in the art without departing from the scope and spirit of the invention which shall be defined only by the following claims and their legal equivalents.

What is claimed is:

1. A tool tip comprising:
a body having a shank, an axial bore, and a flange on the shank adjacent a bottom end of the body, said bore constructed and configured to hold a fastener;
at least one workpiece displacer, each displacer affixed to the body at a peripherally fixed peripheral position on the flange along a periphery of the body surrounding the bore and adapted for displacing workpiece material around the outside of the fastener: and wherein the at least one displacer has a profile to cause non-destructive deformation of the workpiece to affix the fastener to the workpiece without the loss of workpiece material wherein the profile of each displacer is spherical;
wherein the at least one displacer is nonrotatable and rigidly affixed to the body.

2. The tool tip of claim 1 wherein the displacers are pins which project axially from the flange.

* * * * *